(12) United States Patent
Levy

(10) Patent No.: US 8,055,667 B2
(45) Date of Patent: *Nov. 8, 2011

(54) INTEGRATING AND ENHANCING SEARCHING OF MEDIA CONTENT AND BIOMETRIC DATABASES

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,572

(22) Filed: Oct. 20, 2009

(65) Prior Publication Data

US 2010/0161654 A1 Jun. 24, 2010

Related U.S. Application Data

(63) Continuation of application No. 10/794,770, filed on Mar. 3, 2004, now Pat. No. 7,606,790.

(60) Provisional application No. 60/451,840, filed on Mar. 3, 2003.

(51) Int. Cl.
*G06F 17/30* (2006.01)

(52) U.S. Cl. ......... 707/756; 707/769; 707/760; 713/176

(58) Field of Classification Search .................. 707/769, 707/756

See application file for complete search history.

(56) References Cited

U.S. PATENT DOCUMENTS

| 5,210,820 | A | 5/1993 | Kenyon |
| 5,841,978 | A | 11/1998 | Rhoads |
| 5,848,415 | A | * 12/1998 | Guck ............................. 707/831 |
| 5,862,325 | A | 1/1999 | Reed et al. |
| 5,893,095 | A | 4/1999 | Jain et al. |
| 5,911,139 | A | 6/1999 | Jain et al. |
| 5,913,205 | A | 6/1999 | Jain et al. |
| 5,913,214 | A | * 6/1999 | Madnick et al. ...................... 1/1 |
| 5,915,250 | A | 6/1999 | Jain et al. |
| 5,918,223 | A | 6/1999 | Blum et al. |
| 5,983,237 | A | 11/1999 | Jain et al. |
| 6,121,530 | A | 9/2000 | Sonoda |
| 6,122,403 | A | 9/2000 | Rhoads |
| 6,135,646 | A | 10/2000 | Kahn et al. |
| 6,188,010 | B1 | 2/2001 | Iwamura |
| 6,243,713 | B1 | 6/2001 | Nelson et al. |
| 6,360,234 | B2 | 3/2002 | Jain et al. |
| 6,366,907 | B1 | 4/2002 | Fanning |
| 6,374,260 | B1 | 4/2002 | Hoffert et al. |
| 6,401,118 | B1 | 6/2002 | Thomas |

(Continued)

FOREIGN PATENT DOCUMENTS

WO  WO 97/43736  11/1997

OTHER PUBLICATIONS

Wold et al, Content-Based Classification, Search, and Retrieval of Audio, IEEE Multimedia Magazine, Fall, 1996, pp. 27-36.

(Continued)

*Primary Examiner* — Don Wong
*Assistant Examiner* — Binh V Ho

(57) ABSTRACT

Metadata for a content signal is searched by transforming the content signal into different hash formats, each being used to retrieve identifying information from corresponding databases. The identifying information enables retrieval of metadata from metadata databases. These systems and methods enable devices to access a wide array of dynamic metadata from disparate sources through queries that are derived from intrinsic content attributes.

12 Claims, 3 Drawing Sheets

U.S. PATENT DOCUMENTS

| | | | |
|---|---|---|---|
| 6,434,520 B1 | 8/2002 | Kanevsky et al. | |
| 6,463,444 B1 | 10/2002 | Jain et al. | |
| 6,505,160 B1 | 1/2003 | Levy et al. | |
| 6,526,512 B1 * | 2/2003 | Siefert et al. | 726/21 |
| 6,549,922 B1 | 4/2003 | Srivastava et al. | |
| 6,567,980 B1 | 5/2003 | Jain et al. | |
| 6,725,383 B2 | 4/2004 | Kyle | |
| 6,834,308 B1 | 12/2004 | Ikezoye et al. | |
| 6,853,739 B2 * | 2/2005 | Kyle | 382/115 |
| 6,931,451 B1 | 8/2005 | Logan et al. | |
| 6,941,275 B1 | 9/2005 | Swierczek | |
| 6,947,571 B1 | 9/2005 | Rhoads et al. | |
| 6,990,453 B2 | 1/2006 | Wang | |
| 6,996,273 B2 | 2/2006 | Mihcak | |
| 7,010,144 B1 | 3/2006 | Davis et al. | |
| 7,058,223 B2 | 6/2006 | Cox | |
| 7,095,871 B2 | 8/2006 | Jones et al. | |
| 7,143,434 B1 | 11/2006 | Paek | |
| 7,174,293 B2 | 2/2007 | Kenyon | |
| 7,206,820 B1 | 4/2007 | Rhoads et al. | |
| 7,222,163 B1 | 5/2007 | Girouard et al. | |
| 7,251,475 B2 | 7/2007 | Kawamoto | |
| 7,254,285 B1 | 8/2007 | Paek | |
| 7,328,153 B2 | 2/2008 | Wells | |
| 7,359,889 B2 | 4/2008 | Wang | |
| 7,363,278 B2 | 4/2008 | Schmelzer | |
| 7,372,976 B2 | 5/2008 | Rhoads et al. | |
| 7,421,376 B1 | 9/2008 | Caruso | |
| 7,421,723 B2 | 9/2008 | Harkness et al. | |
| 2002/0032864 A1 | 3/2002 | Rhoads | |
| 2002/0033844 A1 | 3/2002 | Levy et al. | |
| 2002/0034373 A1 * | 3/2002 | Morita et al. | 386/1 |
| 2002/0037083 A1 | 3/2002 | Weare | |
| 2002/0052885 A1 | 5/2002 | Levy | |
| 2002/0059580 A1 | 5/2002 | Kalker | |
| 2002/0072982 A1 | 6/2002 | Barton | |
| 2002/0087885 A1 | 7/2002 | Peled et al. | |
| 2002/0088336 A1 | 7/2002 | Stahl | |
| 2002/0126872 A1 | 9/2002 | Brunk et al. | |
| 2002/0178410 A1 | 11/2002 | Haitsma et al. | |
| 2003/0021441 A1 | 1/2003 | Levy | |
| 2003/0033321 A1 | 2/2003 | Schrempp | |
| 2003/0056103 A1 | 3/2003 | Levy et al. | |
| 2003/0105739 A1 | 6/2003 | Essafi | |
| 2003/0126121 A1 * | 7/2003 | Khan et al. | 707/3 |
| 2003/0135623 A1 | 7/2003 | Schrempp | |
| 2004/0024694 A1 * | 2/2004 | Lawrence et al. | 705/38 |
| 2004/0093349 A1 * | 5/2004 | Buinevicius et al. | 707/104.1 |
| 2004/0133582 A1 | 7/2004 | Howard et al. | |
| 2004/0172411 A1 | 9/2004 | Herre | |
| 2004/0199682 A1 * | 10/2004 | Guignard et al. | 710/52 |
| 2004/0213437 A1 * | 10/2004 | Howard et al. | 382/115 |
| 2004/0243567 A1 | 12/2004 | Levy | |
| 2004/0243634 A1 | 12/2004 | Levy | |
| 2005/0141707 A1 | 6/2005 | Haitsma | |
| 2005/0144455 A1 | 6/2005 | Haitsma | |
| 2005/0204037 A1 | 9/2005 | Levy | |
| 2005/0216850 A1 | 9/2005 | Ramos et al. | |
| 2005/0251683 A1 | 11/2005 | Levy et al. | |
| 2005/0259819 A1 | 11/2005 | Oomen | |
| 2006/0020630 A1 | 1/2006 | Stager et al. | |
| 2006/0115108 A1 | 6/2006 | Rodriguez | |
| 2006/0213986 A1 * | 9/2006 | Register et al. | 235/382.5 |
| 2008/0140433 A1 | 6/2008 | Levy et al. | |

OTHER PUBLICATIONS

Foote, Content-Based Retrieval of Music and Audio, Proc. of SPIE, vol. 3229, pp. 138-147, 1997.

Foote, An Overview Of Audio Information Retrieval, ACM-Springer Multimedia Systems 7: 2-10 (1999).

Non-Final Office Action on U.S. Appl. No. 10/794,770, mailed Aug. 31, 2006.

Final Office Action on U.S. Appl. No. 10/794,770, mailed Feb. 20, 2007.

Non-Final Office Action on U.S. Appl. No. 10/794,770, mailed Oct. 3, 2007.

Final Office Action on U.S. Appl. No. 10/794,770, mailed Jun. 16, 2008.

Notice of Allowance on U.S. Appl. No. 10/794,770, mailed Dec. 29, 2008.

Notice of Allowance on U.S. Appl. No. 10/794,770, mailed Jun. 4, 2009.

* cited by examiner

INTEGRATING AND ENHANCING SEARCHING OF MEDIA CONTENT AND BIOMETRIC DATABASES

RELATED APPLICATION DATA

This patent application is a continuation of U.S. patent application Ser. No. 10/794,770, filed Mar. 3, 2004 (now U.S. Pat. No. 7,606,790), which claims benefit to U.S. patent application Ser. No. 60/451,840, filed Mar. 3, 2003, which is hereby incorporated by reference.

TECHNICAL FIELD

This invention relates to management and searching for multimedia content and biometric data database searching, and in particular, relates to searching metadata for multimedia content and biometric data.

BACKGROUND AND SUMMARY

As society moves into the digital age, there are and will be problems of accessing similar data from different database. This can be related to searching for metadata about entertainment content, such as images, audio and video, or related to searching biometric data. For example, each content owner, service provider, or content aggregator of multimedia content or each organization that manages biometric and other identification data can and will have a different database, having a different database protocol (e.g., Oracle Oracle9i versus Microsoft SQL 2000), different database structures (e.g., database field arrangement), different classification schemes (e.g., names for fields and related entries), and different data formats (e.g., biometric data representations for biometric data sets such as facial images, fingerprints, voice signatures, handwritten signatures, iris or retinal images, etc.).

Different databases will exist because there are and will continue to be political, business and security issues in using a standard central database shared across organizations. For example, companies may feel that their database is superior, and thus, build and maintain their own databases for similar types of content that may overlap content represented differently in databases managed by others. There may be so much legacy content that a company, industry, standards body or government will not adopt a standard. In addition, a standard may produce security or privacy issues, such as central databases that know everything about a person or contain information about content across different companies. It is harder to secure certain fields than others on a central database since users have direct access. For example, certain aspects about a person, such as criminal history, may be accessible to only a police officer or FBI agent and not the general public. Similarly, the retail price for entertainment content may be accessible to only registered retailers, and not end users (i.e. consumers).

There are many reasons to search similar data across different databases. For example, identity theft is currently a critical issue. If similar data used to identify a particular individual such as facial images for face recognition, fingerprints, retinal scans, etc., can be searched across different databases structures (e.g., different databases), including using different biometric data representations and templates, the system can catch people that have or are obtaining multiple ID cards, and, thus, reduce identity fraud. Regarding entertainment content, selling metadata to the consumer is a method to increase revenues for an industry trying to deal with rampant digital piracy, as well as a method to fight piracy by providing advantages to legitimate services and purchased content. More specifically, a consumer may want to find songs from different music labels that fit into a specific genre and time period. In this case, there is a need for a method of searching for similar content that corresponds to the consumer's criteria (e.g., some form of song identifier) across different content owner databases to find the song metadata.

One novel method is to have a search-only TransMetaWarp router that knows how to convert (e.g., transform and/or warp—as defined in the detailed section below) search criteria between different databases with similar data. The databases can be different or of the same protocol (e.g., both are Oracle Oracle9i or one is Oracle Oracle9i and the other is Microsoft Access), database structures (e.g., fields arrangement), classification schemes (e.g., names for fields and related entries), and data formats (e.g., biometric data representations or templates and/or content compression methods such as MPEG, Windows Media Format, JPEG, or TIF).

In one embodiment, TransMetaWarp router can be applied to biometric databases, where, for example, different face recognition templates can be the search criteria, and compared via a TransMetaWarp router. This router knows how to convert the original face image to one or more templates, or, alternatively, compare one or more templates directly if either template can re-create the face image. For driver's licenses (DL), the TransMetaWarp router can be controlled by the federal government or some trusted entity, such that states can compare DL face images without having to talk directly or standardize with other states.

In addition, TransMetaWarp can be applied to entertainment content, where the search criteria are content types as described through metadata. For example, one music label may classify music as fast and happy, whereas a different music label may classify music as tempo=5 and mood=5. The TransMetaWarp router knows how to mathematically transform or has been programmed and/or trained how to warp these two (or more—such as when other record labels are added) databases with different classification schemes so that a user can search for music that fits into certain categories across record labels. The schemes can be converted to be compared directly to each other, or, alternatively, a universal search criteria, such as beat=rock and temperament=positive, can be used to inter-relate and search both database classification schemes.

An alternative embodiment is to have a master TransMetaWarp database not just transform the search, but additionally transform the data so it can be saved in a master format on a master database, creating a de-facto standard or using an existing standard. This alternative embodiment can be more efficient on the network when security and privacy issues can be controlled for a central system.

Finally, the flow of content and information during content distribution and consumption causes different participants to require different metadata. This creates further requirements for TransMetaWarp routers or databases. The architecture shows that metadata will have to be searched across various database types. In addition for this architecture, the content can be identified using a content identifier (ID), and this content ID can be provided as the search criteria to a TransMetaWarp router, which in response, searches and returns metadata from different participating databases.

One aspect of the invention is a method for searching for metadata relating to media content. The method receives a content signal, and transforms it into different hash formats, each corresponding to different databases storing hashes of content signals and corresponding identifying information. The identifying information is used to determine identifying information from the corresponding databases, and based on the identifying information, metadata is retrieved for the content signal. Several alternative implementations are described, including system embodiments, including network routing systems that search across several different network databases.

DETAILED DESCRIPTION

Figure 1:
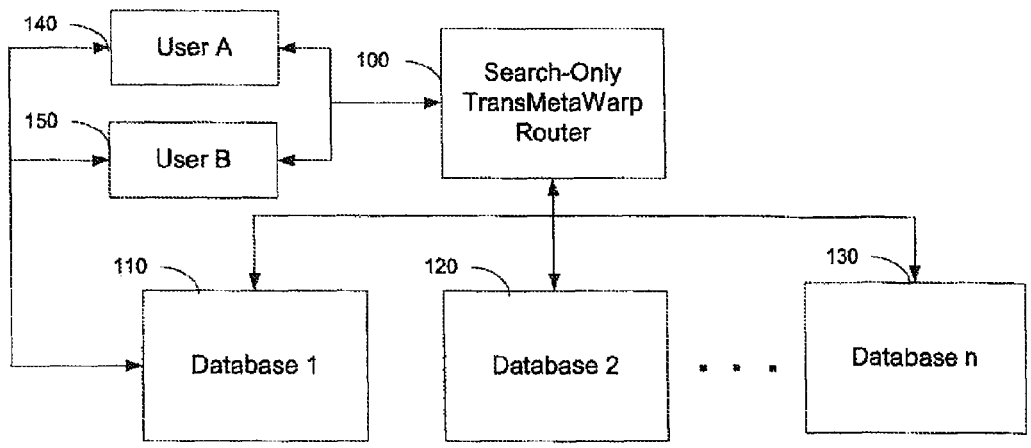
FIG. 1 shows an example of a search-only TransMetaWarp router architecture.

Search-Only TransMetaWarp Router (FIG. 1)

FIG. 1 shows an architecture for a search-only TranMetaWarp router system. A usage scenario is that user A's computing device (box 140) is connected to database 1 (box 110) and submits search criteria via a computer network. Database 1 (box 110) sends the search criteria to the TransMetaWarp router (box 100) to search other databases (e.g., database 2 (box 120) through database N (box 130)). The TransMetaWarp router has access to data such that it can convert the search criteria so that databases 2 through N can understand the search criteria. (As such, the system could be called a TransMetaWarp database, but the term "router" is used to better compare this process to that shown in FIG. 4.) Databases 2 through N return search results to the TransMetaWarp database, which, in turn, returns the appropriate results to database 1 and user A. The TransMetaWarp router may have to convert the results such that database 1 and user A can interpret the results, but this step is usually not required.

The search criteria is converted such that the TransMetaWarp router system can handle different aspects of database searching. For example, different search protocols, such as Structured Query Language (SQL) or other search languages, may be required for the different database protocols (e.g., Oracle Oracle9i versus Microsoft SQL 2000 versus DB4 versus Microsoft Access) and different database structures (e.g., database fields arrangement), different classification schemes (e.g., names for fields and related entries).

In addition, the conversion may include different data formats (e.g., biometric data representations or templates, or image formats, such as JPEG versus GIF, and audio/video formats such as MPEG, Real, or Microsoft Windows Media Format). More specifically, the conversion of the search criteria may be based upon mathematics (referred to as "transformation") when the formats can be mathematically related. Alternatively, the conversion may be based upon training with user data to relate perceptual terms (referred to as "warping"). This training requires people to classify some of the data in database 2 with the classification scheme of database 1, in order to come up with a warping model (and so on for more databases). The warping may be based upon known methods of statistical relationships, such as collaborative filtering or ANOVA (Analysis Of Variance between groups).

The TransMetaWarp database as well as the databases 2 through N can require security classes (a.k.a. security codes) such that database 1 receives only information that is appropriate for it to receive. Thus, database 1 may get different results than database 2, since they may have different security classes. Similarly, user A may get different results than user B (box 150) because each user may have different security classes. As such, these security classes can help protect privacy. In addition, the fact that personal data is not located in one master database, but searchable via a TransMetaWarp router, helps protect privacy since a pirate breaking into a master database cannot obtain all of a person's identity data. The pirate may have to break several databases linked by the TransMetaWarp router. In addition, since the TransMetaWarp router can be remote from User A, it is harder to hack—in other words, more secure. If security classes are not required, they may be omitted.

The security class can be as simple as a ranking from 1 to 3, for example, for the user and data, where 3 is the highest level of security and 1 is the lowest level. The data is only returned if the ranking of the data is equal to or below the user's ranking.

Figure 2:
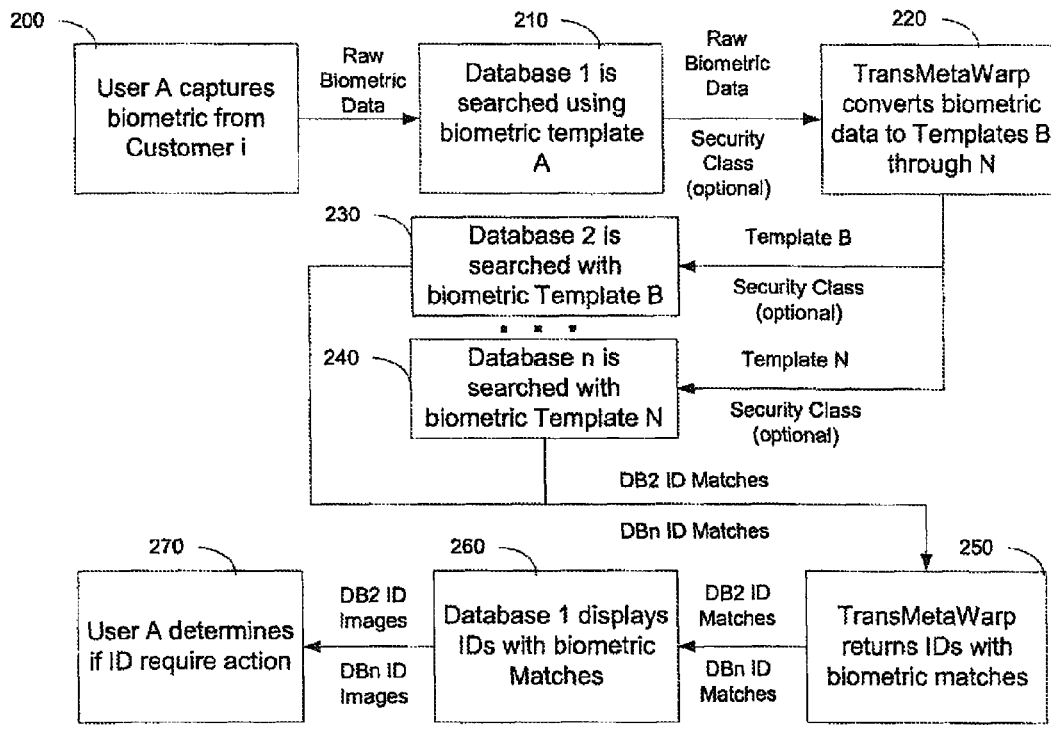
FIG. 2 is a flow chart illustrating an example of biometric data representation searching for ID cards using a TransMetaWarp router.

Search-Only TransMetaWarp Router for Biometrics (FIG. 2)

FIG. 2 shows an exemplar embodiment using biometric data. In step 200, user A captures raw biometric data (e.g., an image of their face, fingerprint, retina, iris, handwritten signature, etc.) from customer i (e.g., a person who is getting an ID card), and sends the raw biometric data to database 1. In step 210, database 1 is searched using biometric template A, and the raw biometric data is sent to the TransMetaWarp router along with user A and/or database 1 security class. As such, for this exemplar embodiment, the search criteria are raw biometric data. Next, in step 220, the TransMetaWarp router converts the biometric data to templates B through N, and sends template B to database 2 (as that is the template format that database 2 uses) and template N to database n (as that is the template format that database n uses) along with the security class and appropriate search language. In step 230, database 2 is searched with biometric template B and appropriate search language, and if any matches are found, the matching ID images are returned to the TransMetaWarp router. Similarly, in step 240, database n is searched (just like databases C through n–1 are searched) with biometric template N and appropriate search language, and if any matches are found, the matching ID images are returned to the TransMetaWarp router. In step 250, the TransMetaWarp router returns ID images which matched the biometric data from databases 2 through n. In step 260, database 1 displays ID images which matched the biometric data. Finally, in step 270, user A determines if the ID image matches the customer and requires actions, like calling the police and delaying the customer i.

Templates, in this example, are a form of biometric data representation. The template is created by taking raw biometric data and transforming it into a data representation that is adapted for searching for matching entries in a database, typically comprising many instances of biometric data representations, each corresponding to a particular individual. The template may be a hash of the raw biometric data. Preferably, the hash reduces the raw data into a reduced data set of distinguishing characteristics. For images, these characteristics may include colors, semantically relevant features, geometric characteristics, transform domain features (e.g., frequency domain, Fourier domain, discrete cosine transform domain, wavelet domain, Karhunen Loeve transform domain, Principal Component Analysis vectors, global statistics, local statistics, edges, textures, etc. In particular for facial images, these features may include 2D or 3D geometry of the face, eyes, nose mouth, such as eyes, nose mouth location in a facial image, transform domain features, local statistics around certain features like the eyes, nose and mouth or in segmented blocks, global statistics across the entire image, etc.

Some biometric databases may use combinations of these characteristics for a particular type of biometric data, as well as two or more different types of biometric data per individual. These database structures provide further opportunities to enhance the searching across different databases and within the data sets in a particular database. For example, the router transforms the raw biometric data into one or more sets of characteristics compatible with a particular database. The router also can receive more than one instance of biometric data of the same type for an individual and refine it into an optimized set of characteristics for a particular database (e.g., perform feature location on eyes, nose, and mouth for each image of a person and combine the results into one optimized template for a particular database based on the characteristics used to identify individuals in the database). The router may also receive different types of biometric data for a person, such as a fingerprint and a facial image, and transform those different types to an optimized set of templates and searches for searching one or more databases simultaneously or in a particular order that effectively narrows the search results. For example, the output of one search may be used to form the search input for another search in another database, such as the case where the results from the facial database search are used to refine the search in the fingerprint database, or vice versa.

Instead of the databases 2 through n interpreting the security class and determining what is appropriate to return, the TransMetaWarp router can interpret the security class and return only the appropriate results. In addition, there may be fewer than n templates for n databases, as other databases may share templates. Alternatively, multiple templates may be used to help speed search as described in U.S. Patent Application 60/418,129, entitled "System And Methods For Recognition Of Individuals Using Combination Of Biometric Techniques," filed Oct. 11, 2002, which is hereby incorporated by reference.

Alternatively, the database 1 may not send the raw biometric data, but send the biometric template as the search criteria. The TransMetaWarp router would then convert the template into other templates, possibly by converting a template to biometric data and then to the other templates, or directly converting between templates. This alternative method involving conversion between templates is less likely to be used since most templates cannot be used to create the original biometric data. In addition, although many templates come from the same biometric data, different hashes of the master template are used for different databases, possibly due to security issues; thus, the templates cannot be converted directly to each other.

The embodiment showed the ID card image being returned. The raw biometrics or a person identifier, such as Social Security number, or both, for example, can be returned. If the raw biometrics are returned, the TransMetaWarp router may have to convert this data into something that the database 1 (i.e. searching database) can interpret and recognize.

The ID card can be a DL, in which case the system may return the other matching DL image, just picture, DL state and number, etc.

Many security and privacy advantages have been described in the general architecture section above. Furthermore, the TransMetaWarp router can be located in a more secure facility than the other databases since it sees all searches, and provides the largest privacy threat. The connections between the databases and TransMetaWarp router must be secure. Many secure communication methods are known in the state of the art, such as Kerberos key exchange and encryption via Digital Encryption Standard (DES), triple DES or Advanced Encryption Standard (AES). For example, https could be used for Internet based communications. Private networks and improved secured communications can be used for more personal data.

For DLs, the databases are the DL databases for the 50 states of the United States of America. In this case, the TransMetaWarp router can be maintained by the federal government, such as the FBI agency. Government networks can be used to increase security. This alleviates state privacy issues since the states cannot track people across states.

Biometric data can include traditional face recognition, fingerprint, palm print, hand written signature, voice signature, iris and retinal scan, or more futuristic ones like odor or saliva recognition, hair sample, skin sample, etc. Many template methods are known for biometrics in the state of the art, for example, as described in: Brunelli, R., and T. Poggio (1993), "Face Recognition: Features versus Templates", IEEE Transactions on *Pattern Analysis and Machine Intelligence,* 15 (http://women.cs.uiuc.edu/techprojectfiles/00254061.pdf); Turk, M., and A. Pentland (1991), "Eigenfaces for Recognition", *Journal of Cognitive Neuroscience,* 3 (http://www.cs.ucsb.edu/~mturk/Papers/jcn.pdf); Zhao, W., and R. Chellappa (2002), "Image-based Face Recognition: Issues and Methods", in B. Javidi (ed.), *Image Recognition and Classification,* Mercel Dekker (http://www.cfar.umd.edu/~wyzhao/publication.html); Zhao, W., R. Chellappa, A. Rosenfeld, and J. Phillips (2002), "Face Recognition: A Literature Survey", University of Maryland Technical Report CS-TR4167R (http://www.cfar.umd.edu/~wyzhao/publication.html); included herein by reference.

In many ID card systems, security classes will be required, but in other cases, they may not be, such as getting a card for a gym. As such, the security codes are optional. The example 3 security class system shown above for media could apply here, too. In addition, the user may interact directly with the TransMetaWarp router, which, in turn, searches the databases (as opposed to the interaction through database 1). This method is similar to that shown below for entertainment content, but uses biometric data.

Furthermore, the databases could respond directly to the user's device. The user's device may be any of a variety of computing devices, including a personal computer, personal digital assistant, telephone, card or document scanner, camera, etc. The databases, routers, and user devices may communicate using any of a variety of existing communication architectures and protocols, including peer to peer, client server, wireless or wire networks, etc. Due to firewalls, it is more reliable, but potentially causes a network bottleneck, to keep an http connection open via the TransMetaWarp router for returning the results. Security issues may also dictate that the databases respond via the TransMetaWarp router.

Figure 3:
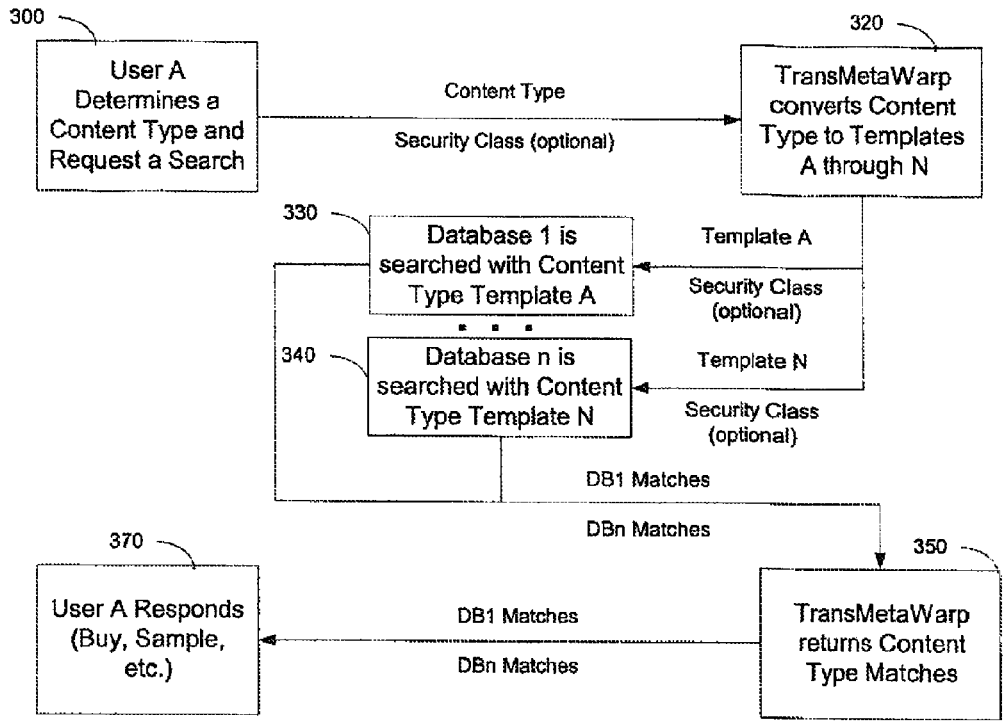
FIG. 3 is a flow chart illustrating an example of entertainment content metadata searching using a TransMetaWarp router.

Search-Only TransMetaWarp Router for Entertainment Content (FIG. 3)

The search criteria for entertainment content can comprise any metadata fields used to describe entertainment content. Some key metadata fields are listed below, and many more are known, such as those listed for audio in ID3v2 tags (www.id3.org):

Content title
Album (for music)
Author/Artist information (band members, movie actors, photographer, etc.)
Editor and composer information
Cover art, back cover art, band picture, etc.
Year
Length
Quality
Similar content
Related merchandise
Author sightings
Key words
Language
Movement
Popularity
Situation
Era
Tempo
Mood
Genre Entertainment content can include audio, video, electronic books, and images. The metadata fields above are general, and different groups are used for each content type. Metadata fields containing perceptual results (e.g., subjective results) are shown in italics.

The search criteria, labeled "content type," are determined from the metadata fields. However, the perceptual terms are usually, but not always important, along with author/artist, title, album (for music), and year.

FIG. 3 shows an exemplar embodiment using entertainment content. In step 300, user A determines a content type to be used as search criteria, requests a search, and forwards the content type to the TransMetaWarp router. In step 320, the TransMetaWarp router converts the content type to templates A through N content types, and forwards each template to the corresponding databases 1 through N, along with the appropriate search language. In step 330, database 1 is searched with template A content type and appropriate search language, and it returns its matches to the TransMetaWarp router. Similarly, in step 340, database n is searched (just like databases B through n-1 are searched) with appropriate search language and template N content type, and it returns its matches to the TransMetaWarp router. In step 350, the TransMetaWarp router returns the matches to user A. In step 370, user A responds to the matches.

User A's response can include, but is not limited to buy, sample (i.e. demo) the complete content or part of the content one or more times, forward content to friends, etc. The options are limitless.

The list of content returned can be a list of music available online for digital distribution via MusicNet, Pressplay, Listen's Rhapsody, etc, or video on MovieLink, or images on Corbis, Getty and Workbook stock agencies, or e-books on Audible or Amazon. It can be songs to license from ASCAP. It can also be a result list with numerous locations to purchase, learn more about the content and author/artists, and learn more about similar content. The links can be delivered to a cell phone and let users know if artists sightings have been located near them.

There are limitless content types. A few examples are included here to further explain the concept of the invention, but not limit its scope. For audio, a content type could consist of rock from 1980-1990 with a hard and fast beat. Or, a content type may consist of classical music from Beethoven with a piano and cello that is happy. For video, a content type could consist of a movie with James Bond and a BMW with a scene in France and French subtitles, or James Dean in a movie in the year 1969 with the word love in the title (is there a match?). For images, a content type may be an image with a house and red flowers, or waterfalls from Portland, Oreg. (via city and state name or GPS coordinates) within 20 miles of the Columbia river, or Madonna from 1979 with a guitar and happy (where the content type used as the search criteria demonstrates the user is looking for the rock star Madonna). For e-books, it could be Star in the title and Picard as a character, or key words sirens and lure.

Alternative embodiments can include numerous modifications of this usage model and architecture. For example, the user A could search database 1, which, in turn, forwards the search request to the TransMetaWarp router for searches of databases 2 through n. In this case, like for the biometric example, the results can be returned via database 1. In addition, the databases could respond directly to user. Due to firewalls, it is more reliable, but potentially causes a network bottleneck, to keep an http connection open via the TransMetaWarp router for returning the results.

One familiar with the state of the art can see there are many methods to populate the perceptual terms, such as choosing from a list of words or from numbers between 1 to 5 or 1 to 10 (or even 1 to 11 so the scheme is one better than the rest). In any case, the transformation of perceptual terms, as shown above in italics, require having people rate different known systems so that, based upon the results, the data warping between different methods can be determined—in other words, based upon training and/or collaborative filtering methods, as described in the general architecture section.

A simple example, shown here for clarification, is that by comparing ratings by the same group of people, the system can determine that the following are equivalent: mood=1 in the master classification scheme setting for the trans-metawarp router, mood=1 in database 1, mood=happy in database 2, mood=upbeat in database 3, mood=3 in database 4, mood=happy in database 5, and mood=1 in database 6. Thus, when mood=1 is searched, the equivalent moods are searched in the other databases. Alternatively, mood=1 is chosen to search in database 1, and the transmetawarp router searches the equivalent moods in the other databases. Note, that in both cases, the transmetawarp router does not contain the data, just the range of entries for each classification scheme.

As described above, the transformation by the TransMetaWarp router may be required due to different database protocols, search protocols, and classification schemes, not only warping due to perceptual terms.

Figure 4:
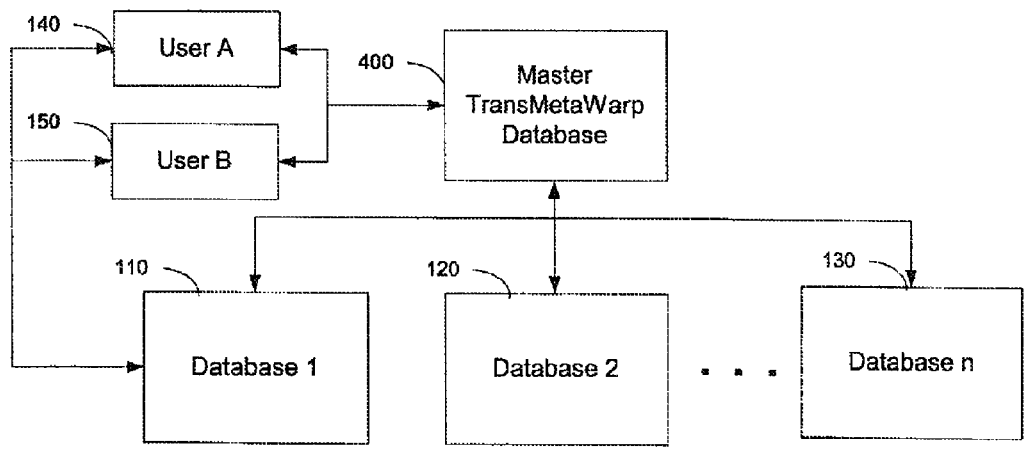
FIG. 4 shows an architecture for an alternative master TransMetaWarp database.

Master TransMetaWarp Database (FIG. 4)

In this alternative embodiment, the TransMetaWarp database has converted data to a master format via transformation and warping methods discussed above. The TransMetaData database makes periodic and automatic updates, or be notified by databases when new data is available, either immediately or periodically, such as daily or weekly. The usage model is similar to that as described above, except rather than the TransMetaWarp router converting the search criteria and sending it to other databases, the TransMetaWarp database does a local search on its data using the de-facto standard or agreed upon standard used in the TransMetaWarp database. One advantage of this system is quicker searching.

Intelligently Distributed TransMetaWarp Routers and Databases for Biometrics

Intelligently distributed TransMetaWarp routers and databases are systems that control search bandwidth or enable cached databases that are not all identical, but based upon an analysis of the desired results. For example, it may be determined that people are most likely to have false driver's licenses in adjoining states since it reduces travel time and costs. As such, the TransMetaWarp router would provide larger bandwidth and/or increased search time or computational access for databases of adjoining states (or states within a certain distance radius—which would be very different on the east coast than rest of the US). The TransMetaWarp database may only cache a database within a state with likely suspects of distant states (e.g., someone with a criminal record) and all participants for adjoining (or states within a certain distance radius) for searching within that state.

The fingerprint SDK used for the test system can classify a fingerprint according to one of eight different primary pattern types, but five of those pattern types are more common and identified correctly with greater accuracy. The five patterns are Whorl, Left Loop, Right Loop, Arch, and Undefined (Pattern Set 1). The Undefined category indicates that the system could not determine a pattern type of the fingerprint. The other three fingerprint pattern types are: (Left Loop, Arch; Right Loop, Arch; and Whorl, Loop (Pattern Set 2). They are less common and are more likely to be incorrect identifications of the pattern type.

Applications of a Router System

There are a number of uses of the router described above. In the context of distributed biometric data, there is a need to protect personal privacy relating to the data and to provide security for unauthorized access and use of the data. The router can be used to control access to various databases automatically by implementing access permission rules. In the case where the biometric databases are controlled by different jurisdictions, entities within the jurisdiction are granted certain access rights, such as "departmental use," "jurisdictional use," "law enforcement use" etc. When an entity issues a search request, the router determines the permission level of the requester, and evaluates this permission level with the permission rules for each database within the scope of the search. Since each database has varying permission rules, the router provides a mechanism for implementing the permission rules in the context of an automated search without the need for the requester to seek the required permission from each jurisdiction and each database.

The permission level may be implemented as part of the security class for the system. For example, the security class includes security of the data transfer from requester to each database and the security of the returned data, and also includes verification that the requester is who he says he is. This user authentication process can include requiring the user to submit security information, such as a secure log-on and password. More sophisticated system can require the requesting user to submit an ID badge to a card reader that authenticates the badge. The system may also include biometric data capture, such as a fingerprint capture, facial image capture, iris or retinal scan, to enable authentication of the person requesting the search.

In some cases, the templates used to search certain databases are in a proprietary format that is not available to the router. In these circumstances, the router does not generate the template, but can still provide services that enhance the search process. One such service is raw data pre-processing that optimizes it for later template creation. This pre-processing is particularly applicable to facial image and fingerprint databases where the raw biometric data is submitted in a raw image form and typically needs some normalization and other pre-processing before computing a template.

One such form of pre-processing for facial images is to apply one or more face finding methods and select the most accurate result for further use in computing the template. The template may be computed at the router, or later, at the individual facial image databases. A similar approach may be used in enhancing fingerprint images before sending the enhanced fingerprint image on to one or more databases. After pre-processing at the router, the search is forwarded to the databases in standard size (e.g., aspect ratio, dimensions and resolution) and format, such as JPEG for facial images, and WSQ for fingerprint images.

In the case where the router is in the path of the data returned from the databases to the user's device, the router can provide the service of formatting disparate results from all of the databases that have been searched into a rendering format compatible with the user's device. This is implemented using a device identifier of the requesting device that informs the router of the constraints of the user's device and formats the data for rendering using a format compatible with the user's device.

Another potential of the router is to formulate search query procedures that are optimized for each database being searched, or for combinations of databases that are being searched. For example, the router is particularly useful in doing multi-mode searching of biometric databases. In this context, a multi-mode search includes searching different types of biometric data (e.g., facial and fingerprint) either simultaneously or in a particular order (e.g., with one set of search results serving as the input probe to a second search in the same or different type of biometric data). It also includes searching the same type of biometric data with different forms of templates. In this type of service, the router gets raw or standardized biometric data files (e.g., JPEG image of face and WSQ image of fingerprint), and formulates the search logic for conducting a multi-mode search across one or more databases.

A related aspect of multi-mode searching of biometric data is the use of two or more classifiers within a particular database to enhance the accuracy of the matching process. This can include using a Bayesian classifier, a Neural Net classifier, a nearest neighbor classifier, etc. in various combinations. The classifier's may be cascaded together: e.g., the output of one classifier is used to filter and narrow the search results for a subsequent classifier.

Another feature that may be used within a particular database, or implemented across databases is to train the classifiers over time based on data from previous outcomes of the classification process. In addition, certain entries in the database can be pruned from the database to provide more accurate results (e.g., pruning duplicates, pruning invalid information, etc.)

Figure 5:
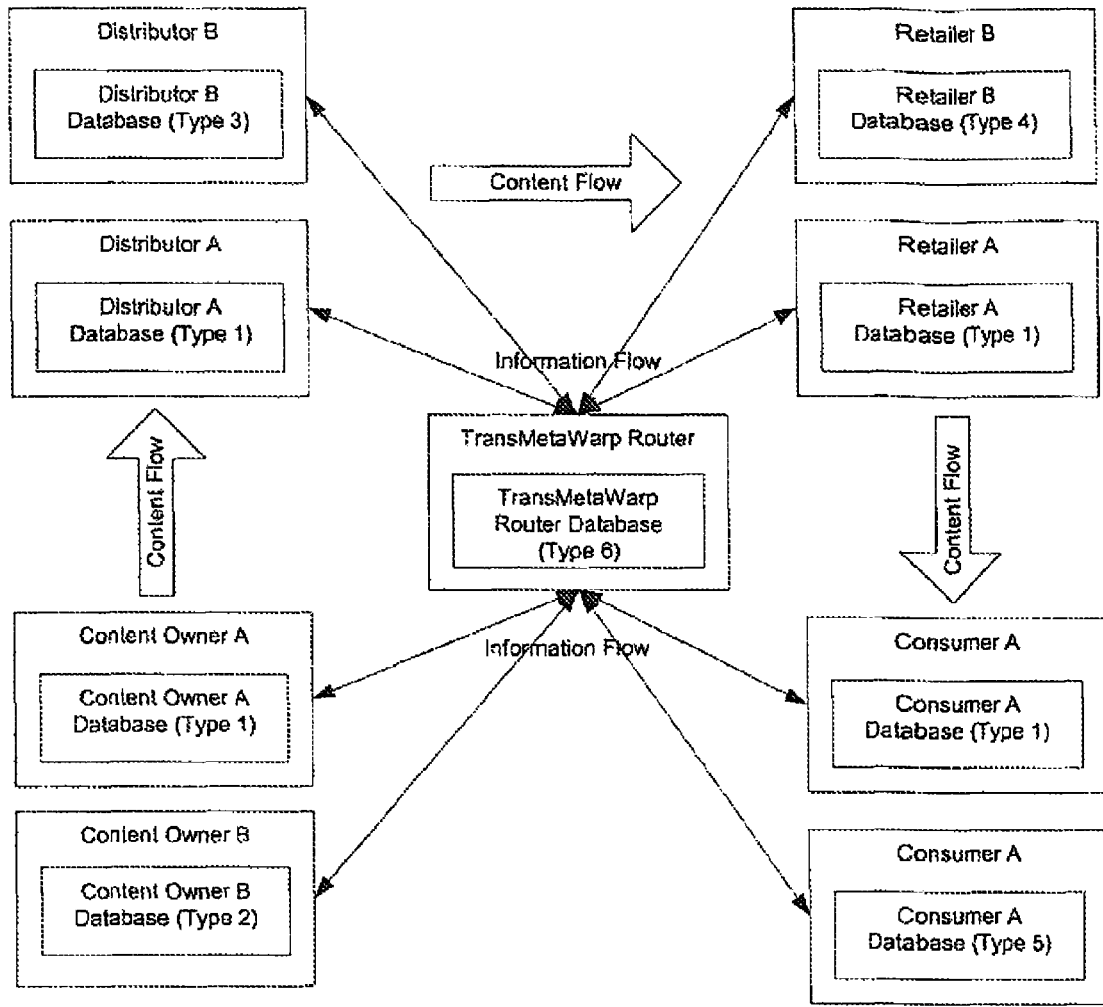
FIG. 5 is an example overview of a complete content flow and information flow architecture for content distribution.

Content Distribution and Information Flow (FIG. 5)

TransMetaWarp and intelligently distributed systems overcome the following problems:

One database structure to store metadata related to the content. It is unlikely that different participants in the content chain, including content owners, distributors, retailers and consumers, will have their needs solved with one database structure.

One database will be stored at central locations, possibly multiple distributed locations, but all databases are identical. Participants, such as content owners and retailers, want to keep much of the data private.

Architectures that require many requests via the network and/or break down due to peak requests, such as with interactive TV, where everyone clicks on the interactive ad within 30 seconds of each other.

Difficult and/or time consuming to enter information about the content (e.g., metadata) into the database The novel concept includes a central TransMetaWarp router and intelligent distributed database structure, which, includes automatic categorization of content, cross-database warping, indexing, annotating, and searching, and distributed structure to handle most requests locally.

This has also been discussed in patent applications: 60/270,782, entitled Efficient Interactive TV Using Embedded Data; 60/257,822, entitled Watermarking Systems and Methods; 60/276,543, entitled Efficient Interactive TV; Ser. No. 10/060,049, entitled Efficient Interactive TV; 60/285,514, entitled User-Friendly Copy Management System; 60/315,569, entitled User-Friendly Copy Management System and Method; and Ser. No. 10/126,921, entitled User-Friendly Rights Management System and Methods, which are hereby incorporated by reference.

Different participants have different needs for the database, and thus, use different structures. Examples of database structures, labeled Type 1 through 6, are shown below. Type 1 can be considered a master database structure where all of the information may not be repeated or is blocked for different participants. The general master format is shown below.

| Unique ID | Usage Rules | Price | Metadata | Links |
| --- | --- | --- | --- | --- |

In Type 1, each section contains fields for each participant.

| Unique Identification (ID) | | |
| --- | --- | --- |
| Content ID | Distributor ID | Retailer ID |
| | Usage Rules | |
| Distributor Usage Rules | Retailer Usage Rules | Consumer Usage Rules |
| | Price | |
| Distributor Price | Retailer Price | Consumer Usage Price |
| | Metadata | |
| Content Title | Description | Mood |
| | Links | |
| Link 1 | ... | Link N |

Although the field exists, the data may not exist or be accessible by that participant. For example, the Type 1 Distributor database may not include the consumer price and may not allow the distributor to access the retailer's usage rules.

In Type 2, some fields are left out and metadata contains different fields and entries. Participants will want to annotate the database to provide personalization, especially for consumers in their databases.

Content is indexed via automatic segmentation and identification algorithms as well as human interpretation, as described above for perceptual terms regarding entertainment content.

The databases are searched via local requests, online retailer requests or system wide searches using the TransMetaWarp router, as described in the embodiments above. This system shows that the TransMetaWarp router may have to convert search criteria, i.e. metadata making up the content type for the search, across not only content owners, but various other participants in the value chain. These participants have different requirements, and, thus, different databases.

In addition, the content may be identified via a digital watermark, header data or fingerprint (a.k.a. content based identification or robust hash). To link the content to its metadata, different databases are searched for the various content owners. In addition, there may be additional metadata provided by any participant of the value chain, such as the retailer, that can be searched for the user.

Database entries can be inter-related by similar metadata and collaborative filtering. An interesting type of metadata that can be used is location, such as GPS coordinates, of the creation of the content. For example, photographs or scenes of a movie can automatically have the GPS coordinates watermarked into the image(s). The coordinates can be read and automatically entered into the database's metadata and used to cross-link and images with similar locations as well as allow searching by coordinates.

Using Digital Watermarking and Other Auxiliary Data Carriers with the Router System Digital watermarking systems may be used in combination with the router systems described in this document. Digital watermarks embedded in identity documents (e.g., such as the images printed on Driver's Licenses) or within biometric images (facial images or fingerprint images) can provide links to related biometric information stored in a dynamic database. This enables the biometric information to be updated over time while the identifier that indexes this information is persistently embedded in the document or image.

Digital watermarks can be embedded in the facial, fingerprint and other biometric images so that they can be persistently associated with a particular person and/or database. The digital watermark carries an identifier that links it to a particular person and/or system so that it can be traced back to that system, and so that the image that carries it can be associated with related information about a person, including other biometric data.

This digital watermark may also convey permission rights and other access control information that is used by the router to control access to various types of databases.

Other machine-readable data carriers may be used within identity documents to provide links to dynamic databases, to store biometric data representations or templates, to authenticate the identity document. These carriers include smart cards, magnetic stripes or ink, RFID, bar codes (including two dimensional bar codes, etc.).

The digital watermark may also be used to authenticate an identity document through copy detect authentication (e.g., the watermark is designed to degrade in response to copying to distinguish an original from a copy of a document), and detection of alteration of information on an identity document (the watermark carries data that is cross referenced on the document to determine whether the document has been altered).

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark. Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914 which are hereby incorporated by reference.

Facial Recognition Methods

Previously, we described how the router is particularly useful for searching across biometric databases because they differ in ways that lend themselves to distributed searching with the use of a router. These differences include differences in database structure, data format, template design, search procedure, security protocol, permission rules, methods for pre-search optimization, etc. One type of biometric database that the router is particularly suited for is facial image databases. This section describes facial recognition approaches, including processes for creating templates used to search facial image databases, and classification schemes used to find matches between a template in a search request and one or more matching entries in a facial image database.

The two core problems in face recognition (or any other pattern recognition task) are representation and classification. Representation tackles the problem of measuring and numerically describing the objects to be classified. Classification seeks to determine which class or category an object most likely belongs to. Whatever their application domain, almost all pattern recognition problems differ primarily in their representation—the techniques used in classification can be used on the output of any representation scheme and are common to all pattern recognition domains (such as optical character recognition, information retrieval, and bioinformatics). The two tasks are sometimes bundled together algorithmically but are usually separable.

Representation and classification algorithms are discussed in turn below. Other face recognition tasks (face detection, tracking in video, registration, size normalization, etc.) are not addressed here.

Representation

Representation, or parameterization, is the process of extracting, measuring, and encoding in a template an object's distinguishing characteristics, which are in turn used to train or query a generic classifier. Although this process is also referred to as "feature extraction" in the pattern recognition literature, the term "feature" is reserved here for its more specific face recognition meaning, viz., a part of the face (mouth, forehead, eye, etc.). The purpose of representation is to provide training data or queries to the face matching or face classification engine that will allow it to distinguish between individuals or classes. Generally, it attempts to compress as much useful information into as few parameters as possible since classification algorithms may become inefficient or intractable as the representation set increases in size. Perhaps less obviously, the utilization of too much or excessively detailed or irrelevant information in training can lead to overfitting and degrade the classifier's generalization accuracy. On the other hand, the representation should contain enough information to enable the classifier to distinguish between many faces or classes.

The various approaches to representation are described and evaluated below. They may be neatly categorized in at least three different ways: by facial coverage (holistic or local), by source data type (image-based or geometric), and by facial dimension (2D or 3D). In general, earlier methods approached face recognition as a 2D problem and performed well for controlled conditions and few classes. However, none are very robust. For example, holistic approaches in general benefit from their use of face-wide information but are not invariant to illumination or pose. Local methods are better at handling these problems but are, by their very nature, limited information methods. More recent methods have attempted to measure or estimate 3D facial structures in order to obtain more robust recognition results—the separate discussion of 3D methods below reflects their novelty.

Geometric

Most early methods attempted to quantify the structure of the face by identifying key points (e.g., corner of eye, tip of nose, edge of forehead, etc.) and measuring the distances between them (Kelly, 1970; Brunelli and Poggio, 1993). A more recent structural approach, the Active Shape Model (ASM) (Cootes, et. al., 1995), performs Principal Components Analysis (PCA, explained in more detail below) on the coordinates of the key points for a set of training faces. The resulting principle components, or eigenvectors, encode the most important sources of facial variation and are used to compute a set of scores for faces to be recognized.

Geometric methods are simple and lighting invariant but their performance is obviously sensitive to variations in pose. Since the automatic identification of corresponding points on different faces can also be a problem, relatively few points are used in practice.

Holistic Image-Based

Holistic approaches seek to mimic the way the human brain initially recognizes faces, i.e., by forming a single overall impression of the face (as opposed to noting, say, the distance between the eyes or the size of the nose). Unlike the geometric or structural approaches mentioned above, image-based approaches use as inputs the pixel intensity values of facial images. Most models in the intersection of holistic and image-based approaches center on what are called "eigenfaces" (Kirby and Sirovich, 1990; Turk and Pentland, 1991).

In a procedure developed at MIT, eigenfaces are generated by performing PCA (or the Karhunen-Loeve transform) on the pixel covariance matrix of a training set of face images. The resulting eigenvectors form an orthogonal basis for the space of images, which is to say that every training image may be represented as a weighted sum of the eigenvectors (or "eigenfaces", if rasterized). Given a test or query image, the system approximates it as a linear combination of the eigenfaces—difference in the values of the eigenface weights are used by the classifier to distinguish between faces.

Since there is a great deal of inter-pixel dependence in the covariance matrix, most facial variation can be captured by a relatively small number of eigenfaces. Discarding the rest as noise, the most important eigenfaces form a new reduced-dimension space which efficiently encodes facial information and allows the model to generalize, i.e., to identify faces that are similar overall and ignore (hopefully) unimportant differences between images of the same person. How many eigenfaces to retain is a question of balance: too many eigenfaces learn the details and the model fails to generalize; too few and its discriminating power is weakened.

Eigenface methods have been shown to work well in controlled conditions. Their holistic approach makes them more or less insensitive to noise, small occlusions, or modest variations in background. Using face-wide information, they are also robust to low resolution (recall that details are discarded as noise in any case). However, they are not invariant to significant changes in appearance (such as pose, aging, or major occlusions) and especially to illumination intensity and angle.

The eigenface technique may be extended by using some other set of vectors as a basis, such as independent components. A generalization of PCA, Independent Components Analysis (ICA) (Oja, et. al., 1995) extracts the variability not just from the covariances but from higher order statistics as well. The resulting basis vectors, while functionally similar to eigenvectors, are statistically independent, not just uncorrelated. The use of higher order statistics potentially yields a set of basis vectors with greater representative power but also requires more computation time.

The set of basis vectors may also be chosen using a genetic algorithm (GA) (Mitchell, 1996; Liu and Wechsler, 2000), a machine learning algorithm consisting of large numbers of sub-programs that "compete", are "selected", and "reproduce" according to their "fitness" or ability to solve the problem (in this case, their ability to differentiate the many classes from each other). Occasional "mutations" stimulate the continued search for new solutions as the "population" of sub-programs "evolves" to an improved set of basis vectors. Note that, unlike other representative approaches, this one is not separable from the subsequent classification task for it is the latter that provides "fitness" feedback to the GA.

It should be mentioned in passing that it is possible to represent an image by its unprocessed pixel intensity values, which can in turn be fed directly to a classifier. This approach will be revisited later.

Local Image-Based

In Local Feature Analysis (LFA) (Penev and Atick, 1996), feature templates or filters are used to locate the characteristics of specific facial features (eyes, mouth, etc.) in an image. The features are extracted and their locations, dimensions, and shapes quantified and fed into a classifier. Local features may also be extracted and parameterized in the same manner as are eigenfaces—the application of PCA to sub-regions of interest yields what may be called "eigeneyes" and "eigenmouths", etc.

The detection of particular shapes is often efficiently accomplished in the frequency domain, the Gabor transform being particularly useful for locating and representing local features (Potzsch, et. al., 1996). The Gabor transform is a sort of normal curve-windowed Fourier transform that localizes its region of support in both spatial and frequency domains. Using a number of Gabor "jets" as basis vectors, the system extracts facial features and represents the face as a collection of feature points, much as the human visual system does.

Because they focus on detailed local features, local image-based methods require high-resolution images as input. However, their use of structural information makes them relatively robust to variations in illumination.

A particularly successful variation on this approach is Elastic Bunch Graph Matching (EBGM) (Wiskott, et. al., 1999), a method pioneered at USC. EBGM first computes "bunches" of Gabor jets at key locations and then performs a flexible template comparison.

3D

The hope and promise of more accurate and robust face recognition seems to hang on the measurement or estimation of faces as 3D objects. Many of the approaches discussed in previous sections could be profitably extended to 3D if the face's 3D structure could be reliably captured.

One way to estimate a face's 3D structure is to use a series of 2D facial images of various orientations. If point-to-point correspondences can be established between different poses, the locations of those points in 3D space can be estimated by triangulation (Vetter and Blanz, 1998). Alternatively, estimation can be formulated as a constrained optimization problem, i.e., to find the 3D shape (a) that is as similar in structure as possible to some prototype or "average" face and (b) whose 2D projections are consistent with the given facial images (Blanz and Vetter, 1999; Romdhani, et. al., 2002). If only one 2D image is available and, importantly, if the subject is illuminated by a single off-center light source, it may be possible to employ the Shape From Shading (SFS) model (Zhao and Chellappa, 2002). This method uses a physical illumination model and the assumption of facial symmetry to estimate a 3D structure.

Since 3D facial representations contain more information than 2D ceteris paribus, they should yield more accurate recognition results, particularly when pose-invariance cannot be assured. 3D representation is, however, still a difficult problem, particularly establishing point-to-point correspondence for a sufficient number of points. Many of the current solutions are hardware-dependent (using multiple or video cameras) and/or require more cooperation from the subject than a single static image.

Classification

The task of a classifier in pattern recognition is to compute the probability (or a probability-like score) that a given pattern or example (here, a face) belongs to a pre-defined class. It accomplishes this by first "learning" the characteristics (the parameters of the templates that were computed during the representation step) of a set of "labeled" training examples (i.e., examples of known class membership) and saving them as a "class profile". The template parameters of new query patterns or examples of unknown class membership are then compared to this profile to yield probabilities or scores. The scores are used in turn to determine which class—if any—the query pattern likely belongs to. In spatial terms, classifiers seek to find hyperplanes or hypersurfaces that partition the template parameter space into separate class subspaces.

Machine learning approaches to classification are unreliable or difficult to implement without adequate training examples, the more so when the classifier is required to distinguish between many classes. Although classifiers may perform poorly under such conditions, most can be retrained quickly or incrementally as new examples become available. In the limit, a set with only one example per class poses a pattern matching problem rather than the type of pattern recognition problem discussed here. Strictly speaking, pattern matching routines are not "trained" in the machine learning sense but rather yield a similarity or distance metric in a straightforward manner.

Four major approaches to classification are presented below—all have been used in face recognition applications. They are discussed in order of increasing flexibility and, generally, decreasing ease of training.

Discriminant

One of the simplest classification routines is Linear Discriminant Analysis (LDA). In LDA, a discriminant function projects the data such that the classes are linearly separated (as much as possible) in template parameter space. LDA is fast and simple but inflexible.

Based on statistical learning theory (Vapnik, 1998), the Support Vector Machine (SVM) is a fairly recent method that has been shown to be both accurate and (using a linear kernel) quick to train Like LDA, the SVM finds a hypersurface in template parameter space that separates training examples as much as possible. While the LDA computes the separator based on the locations of all training examples, however, the SVM operates only on examples at the margins between classes (the so-called "support vectors"). The SVM can accommodate nonlinear kernels, in effect separating classes by hypersurfaces. Nonlinear kernels, of course, can take much longer to train.

Probabilistic

Most probabilistic classifiers use Bayes' formula to estimate the probability that a given template belongs to a specific class—the estimation is based on conditional probabilities (the probabilities of observing the template among all possible templates of the various classes) and prior probabilities (the probabilities, given no other information, of encountering examples from the classes). In the most common version, the templates are found or assumed to be distributed according to a particular probability density function (PDF), typically normal. "Training" in this case consists of collecting the statistics (such as mean and variance) of a set of training examples for each of the several classes. Given the PDF parameters and a query template, the conditional probabilities can be easily estimated for each class.

A Bayesian approach can easily accommodate non-sample information (e.g., in the form of educated guesses) and is therefore well suited to sets with small sample sizes. Under certain plausible assumption and using Parzen windows, for example, it is even possible to "train" a Bayesian classifier with one template per class.

Neural

Neural networks have been found to be a very powerful classification technology in a wide range of applications. Mimicking the densely interconnected neural structure of the brain, neural networks consist of multiple layers of interconnected nodes with nonlinear transfer functions. Input values are weighted at each connection by values "learned" in training, summed, warped, passed on to one or more "hidden" layers, and finally to an output layer where the scores are computed.

The power of a neural network lies in its ability to model complex nonlinear interdependencies among the template parameters and to approximate arbitrary PDFs. Neural networks can be expensive to train in batch mode but can also be trained incrementally. Unfortunately, their tendency to overfit the training data, the danger of convergence to local error minima, and the inexact "science" of neural architecture design (i.e., determining the optimal number and structure of layers, nodes, and connections) combine to demand a problem-specific handcrafted trial-and-error approach.

As suggested previously, an image's pixel intensity values may be passed directly (or with local averaging to reduce noise) to a classifier. Used in this manner, neural networks in effect force the task of representation onto the hidden layers.

Method Combination

One intuitive and easy-to-implement approach is to wire together two or more classifiers in parallel and/or in series. In the parallel case, the scores or probabilities of the several classifiers are fed to another classifier (loosely defined) that votes on, averages, or in some other way combines them. Although any standard classifier (e.g., probabilistic, neural) can serve as the combination engine, a simple averager has been found to work surprisingly well in many cases. In series, it may sometimes be advantageous to use an inexpensive classifier to winnow out the best candidate examples in a large set before using more powerful classifiers.

The use of method combination has been motivated by diminishing returns to classifier extension and refinement even as it has been made possible by desktop computing power unimaginable when face recognition was a nascent field. There is no guarantee that this approach will produce dramatic improvements, especially if the upstream classifiers are already accurate. If the classifiers are of distinctive paradigms, however, method combination will tend to take advantage of their differing strengths and return more accurate results.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the processes may be implemented in a programmable computer or a special purpose digital circuit. Similarly, the data representation and classification processes may be implemented in firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

The invention claimed is:

1. A method for searching for metadata relating to media content, the method comprising: receiving, from a first computing device, a content signal;

transforming the content signal into two or more different hash formats to derive digital watermark data embedded in the content signal, and using the digital watermark data to retrieve metadata for the content signal, wherein the two or more different hash formats correspond to different databases, and wherein the databases store hashes of content signals and corresponding identifying information;

using the two or more different hash formats to determine identifying information from the corresponding databases; and based in part on the identifying information, retrieving metadata for the content signal.

2. The method of claim 1, wherein the hash format comprises a template for a pattern recognition database.

3. The method of claim 2, wherein the template comprises a template of image signal features.

4. The method of claim 1, wherein the content signal is transformed on a client computing device, and the different hash formats are sent from the client computing devices to a router system that issues queries to corresponding databases to obtain the identifying information.

5. A computer readable medium on which is stored instructions that, if executed by a computing device, cause the computing devices to perform operations comprising:

receiving, from a first computing device, a content signal;

transforming the content signal into two or more different hash formats to derive digital watermark data embedded in the content signal, and using the digital watermark data to retrieve metadata for the content signal, wherein the two or more different hash formats correspond to different databases, and wherein the databases store hashes of content signals and corresponding identifying information;

using the two or more different hash formats to determine identifying information from the corresponding databases; and based on the identifying information, retrieving metadata for the content signal.

6. A system for searching for metadata relating to media content, the system comprising:
- a memory for receiving and storing a content signal;
- a computing device programmed to transform the content signal into two or more different hash formats to derive digital watermark data embedded in the content signal, and using the digital watermark data to retrieve metadata for the content signal, wherein the two or more different hash formats correspond to different databases, and wherein the databases store hashes of content signals and corresponding identifying information;
- the computing device further programmed to use the two or more different hash formats to obtain identifying information from the corresponding databases; and
- the computing device further programmed to retrieve metadata for the content signal from one or more metadata databases using the identifying information.

7. The system of claim 6, wherein the hash format comprises a template for a pattern recognition database.

8. The system of claim 7, wherein the template comprises a template of image signal features.

9. The system of claim 6, wherein the content signal is transformed on a client computing device, and wherein the different hash formats are sent from the client computing devices to a router system that issues queries to corresponding databases to obtain the identifying information.

10. The computer readable medium of claim 5, wherein the hash format comprises a template for a pattern recognition database.

11. The computer readable medium of claim 10, wherein the template comprises a template of image signal features.

12. The computer readable medium of claim 5, wherein the content signal is transformed on the computing device, and the different hash formats are sent from the computing devices to a router system that issues queries to corresponding databases to obtain the identifying information.

* * * * *